United States Patent [19]
Jones et al.

[11] Patent Number: 5,957,440
[45] Date of Patent: Sep. 28, 1999

[54] ACTIVE FLUID MOUNTING

[75] Inventors: Peter J. Jones, Erie, Pa.; Douglas E. Ivers, Cary, N.C.; Kevin C. Cooney, Erie; Gerald P. Whiteford, Waterford, both of Pa.

[73] Assignee: Lord Corporation, Cary, N.C.

[21] Appl. No.: 08/835,433

[22] Filed: Apr. 8, 1997

[51] Int. Cl.$^6$ .................................................... F16F 5/00
[52] U.S. Cl. .............................. 267/140.14; 267/140.15; 244/54; 248/550
[58] Field of Search ........................... 267/136, 140.11, 267/140.13–140.15, 219, 299; 188/379, 380; 248/550, 562; 244/54; 702/56

[56] References Cited

U.S. PATENT DOCUMENTS

| | | | |
|---|---|---|---|
| 2,964,272 | 12/1960 | Olson | 248/19 |
| 4,389,045 | 6/1983 | Taylor | 267/8 R |
| 4,600,863 | 7/1986 | Chaplin et al. | 318/114 |
| 4,624,435 | 11/1986 | Freudenberg | 248/550 |
| 4,637,584 | 1/1987 | Takehara | 248/559 |
| 4,638,983 | 1/1987 | Idigkeit et al. | 267/140.1 |
| 4,693,455 | 9/1987 | Andrä | 267/140.1 |
| 4,720,084 | 1/1988 | Hollerweger et al. | 267/217 |
| 4,793,600 | 12/1988 | Kojima | 267/140.1 |
| 4,811,919 | 3/1989 | Jones | 244/54 |
| 4,869,474 | 9/1989 | Best et al. | 267/136 |
| 5,011,108 | 4/1991 | Chen et al. | 248/550 |
| 5,052,529 | 10/1991 | Sutcliffe et al. | 188/378 |
| 5,067,684 | 11/1991 | Garnjost | 248/550 |
| 5,108,045 | 4/1992 | Law et al. | 241/54 |
| 5,116,029 | 5/1992 | Gennesseaux | 367/140.1 |
| 5,133,527 | 7/1992 | Chen et al. | 248/550 |

(List continued on next page.)

FOREIGN PATENT DOCUMENTS

| | | |
|---|---|---|
| 0 447 307 A1 | 9/1991 | European Pat. Off. . |
| 0 516 304 A2 | 12/1992 | European Pat. Off. . |
| 0 537 927 A1 | 4/1993 | European Pat. Off. . |
| 36 39 091 A1 | 5/1988 | Germany . |
| WO 92/02107 | 2/1992 | WIPO . |
| 9612121 | 4/1996 | WIPO . |
| WO 97/41384 | 11/1997 | WIPO . |

OTHER PUBLICATIONS

U.S. Patent Application No. 08/145,430 "Decouplers for Active Devices"; Ivers, et al. pp. 1–25, 6 Sheets of Drawings.
L.R. Miller and M. Ahmadian, Lord Corporation, "Active Mounts—A Discussion of Future Technological Trends".
Unholtz–Dickie Corporation, "Vibration and Vibration Testing".
Wallace C. Flower, *Understanding Hydraulic Mounts for Improved Vehicle Noise, Vibration and Ride Qualities*, May 1985, Lord Corporation Brochure LL–2166.

*Primary Examiner*—Chris Schwartz
*Attorney, Agent, or Firm*—Randall S. Wayland

[57] ABSTRACT

An active fluid mounting for isolating vibration between a vibrating member (21) and a structure (23). In one aspect, the active fluid mounting (20) includes an inner member (22), an outer member (24), a first flexible element (26), and an cartridge-like active fluid element (28) which is unitary and readily detachable, attached between the inner and outer members, (22) and (24). The cartridge-like active fluid element (28) preferably includes a first housing member (30) for attachment to inner member (22), a second housing member (32) for attachment to outer member (24), a second flexible element (34) for flexibly interconnecting first housing member (30) to second housing member (32), at least one fluid chamber (36) having a volume stiffness, a fluid (40) contained within, a moveable piston (42) interacting with fluid (40) in the fluid chamber (36) to cause pressure variations and produce dynamic forces which act between the inner and outer member, (22) and (24), and a preferable coil-and-magnet assembly (44) for driving piston (42) housed internally within active fluid element (28). In another aspect, a piston (42a) which is inductively driven is described. In yet another, an interchangeable motor unit including a magnet (68), coil (70), and pole pieces (66) is received within the inner member (22).

19 Claims, 5 Drawing Sheets

5,957,440
Page 2

U.S. PATENT DOCUMENTS

| | | | |
|---|---|---|---|
| 5,174,552 | 12/1992 | Hodgson et al. | 267/140.11 |
| 5,176,339 | 1/1993 | Schmidt | 244/54 |
| 5,197,692 | 3/1993 | Jones et al. | 244/54 |
| 5,219,037 | 6/1993 | Smith et al. | 180/312 |
| 5,231,336 | 7/1993 | van Namen | 318/128 |
| 5,238,232 | 8/1993 | Kobayashi et al. | 267/140.14 |
| 5,251,883 | 10/1993 | Simon et al. | 267/136 |
| 5,261,649 | 11/1993 | Kato et al. | 267/140.12 |
| 5,297,781 | 3/1994 | Gennesseaux | 267/140.14 |
| 5,323,133 | 6/1994 | Heath et al. | 335/222 |
| 5,332,203 | 7/1994 | Gossman et al. | 267/140.15 |
| 5,333,455 | 8/1994 | Yoshioka | 60/533 |
| 5,333,846 | 8/1994 | Goto et al. | 267/140.14 |
| 5,346,192 | 9/1994 | Weltin et al. | 267/140.14 |
| 5,351,930 | 10/1994 | Gwinn et al. | 248/557 |
| 5,374,039 | 12/1994 | Schmidt et al. | 267/140.13 |
| 5,413,320 | 5/1995 | Herbst | 267/140.13 |
| 5,423,523 | 6/1995 | Gossman et al. | 267/140.15 |
| 5,427,347 | 6/1995 | Swanson et al. | 248/550 |
| 5,439,082 | 8/1995 | McKeown et al. | 188/379 |
| 5,452,884 | 9/1995 | Gugsch et al. | 267/140.14 |
| 5,492,312 | 2/1996 | Carlson | 267/140.14 |
| 5,526,292 | 6/1996 | Hodgson et al. | 364/574 |
| 5,551,650 | 9/1996 | Southward et al. | 244/54 |
| 5,570,286 | 10/1996 | Margolis et al. | 364/424.05 |
| 5,601,280 | 2/1997 | Nagaya et al. | 267/140.14 |
| 5,655,757 | 8/1997 | Starkovich et al. | 267/140.15 |
| 5,730,429 | 3/1998 | Ivers et al. | 267/140.14 |
| 5,762,295 | 6/1998 | McGuire et al. | 244/54 |
| 5,802,184 | 9/1998 | Heath | 381/71.4 |

ACTIVE FLUID MOUNTING

FIELD OF THE INVENTION

This invention relates to devices for controlling dynamic vibration. Specifically, it relates to actively-controlled mountings for control of vibration between a vibrating member and structure.

RELATED APPLICATIONS

This application for a patent is related to application Ser. No. 08/835,436 entitled "Active Vibration Absorbers" which is filed contemporaneously herewith.

BACKGROUND OF THE INVENTION

Passive mountings comprise a passive spring element, such as an elastomer section, and attach between an engine and structure to isolate vibration therebetween. Examples of passive mountings are described in commonly assigned U.S. Pat. Nos. 5,351,930, to Gwinn et al., 5,176,339, to Schmidt et al. and 5,108,045, to Law et al. Passive mountings have the disadvantage that annoying and/or noise-producing vibration cannot, in general, be completely eliminated.

Fluid mountings are generally described in LORD® Technical Article LL-2166 entitled "Understanding Hydraulic Mounts for Improved Vehicle Noise, Vibration and Ride Qualities" by W. C. Flower. Commonly assigned U.S. Pat. No. 4,811,919 to Jones describes a fluid mounting which incorporates a volume compensator. Other examples of fluid mountings may be found in commonly assigned U.S. Pat. Nos. 5,413,320 to Herbst, 5,374,039 to Schmidt et al., and 5,197,692 to Jones et al. Fluid mountings are, in essence, tunable passive devices which use a fluid to add additional damping or tuned-fluid "inertia" effects. Fluid mountings have the disadvantage that although they provide improved isolation, as compared with passive mountings, they are generally only effective within a relatively narrow frequency range.

Active fluid mountings which attach between a structure and engine for actively isolating vibration therebetween are generally known. Commonly assigned U.S. Pat. No. 5,427,347 to Swanson et al., describes an active fluid mounting apparatus which may use a simple feedback control. Commonly assigned U.S. Pat. No. 5,174, 552 to Hodgson et al. describes another active fluid mounting. Further examples of active fluid mountings are found in U.S. Pat. Nos. 5,439,082 to McKeown et al., 5,333,455 to Yoshioka, 5,238,232, to Kobayashi et al., 5,116,029 to Gennesseaux, 5,067,684 to Garnjost, 4,693,455 to Andra, and 4,638,983 to Indigkeit et al.

However, none of these prior art mountings provide a compact active fluid mounting which can be controlled to isolate vibration over a wide frequency range and which addresses the need for easy change out of the active portion when its useful life is met, i.e., when refurbishment is required or to easily adjust the output characteristics, and/or to allow interchangeability of the active mounting for multiple application platforms.

SUMMARY OF THE INVENTION

Therefore, in light of the advantages and drawbacks of the prior art, the present invention is an active fluid mounting for attaching between a vibrating member and a structure which is adapted for controlling vibration therebetween. The active fluid mounting includes a passive mounting with a readily-replaceable, cartridge-like, unitary and detachable active fluid element contained therein. The active fluid element can be readily detached and changed out upon reaching its useful life, or if an adjustment is needed and, furthermore, it can be adapted for use on many different mounting applications.

The active fluid element includes a dynamically-driven piston member contained therein for actively operating upon the fluid within a fluid chamber, and preferably, pumping the fluid between first and second fluid chambers to generate the active forces which are applied between the inner and outer member of the passive mounting.

More specifically, in one aspect, the active fluid mounting comprises, in combination, a passive mounting including an inner member for attachment to the vibrating member or structure, an outer member for attachment the other of the vibrating member and structure and a first flexible element, such as an elastomer section, which flexibly interconnects the inner and outer members. The cartridge-like active fluid element is unitary and easily and readily replaceable. Preferably it does not derive any of its dynamic fluid characteristics (volume stiffness Kv) from the first flexible element of passive mounting. The active fluid element is preferably received within a hollow formed in the outer member and is interconnected between the inner and outer member of the passive mounting and provides oscillatory dynamic forces therebetween.

In another aspect, the active fluid element comprises a first housing member for attachment to the inner or outer member, a second housing member for attachment to the other of the inner and outer member, a second flexible element, such as an annular elastomeric tube-form section, for flexibly connecting first housing member to second housing member and for accommodating at least axial motion therebetween. The active fluid element further comprises at least a first fluid chamber, and preferably first and second fluid chambers therewithin, each having a defined volume stiffness (Kv), and a fluid contained within. A moveable piston located within the active fluid element, interacts with at least a first fluid chamber, and preferably first and second fluid chambers, to cause dynamic pressure variations therein. This produces active dynamic forces which act between the inner member and outer member of passive mounting. Means for driving the piston is housed internally within the active fluid element.

In another aspect, the means for driving said piston is preferably a coil and pole-and-magnet assembly located within the active fluid element, which is further at least one permanent magnet and pole pieces.

In another aspect, the means for driving said piston comprising the coil and the magnet-and-pole assembly are included within a replaceable drop-in motor unit. The drop-in motor unit may also be contained within the active fluid element to further enhance refurbishment.

In another aspect, the piston is integral with and directly connected to the wound wire coil and always moves axially therewith. Preferably, the piston is included within a third chamber which interacts with the first and second chambers through ports.

In another aspect, the wound coil and permanent magnet are stationary relative to each other and a preferably annular nonmagnetic, yet conductive, piston is driven due to "inductive" coupling between the piston and the fields generated by the coil and magnet-and-pole assembly.

In yet another aspect, the piston is comprised of an assembly including a wire coil circumferentially wound about a bobbin, where the fluid is pumped by the terminal ends of the assembly.

In another aspect, a third flexible element may be included which acts to decouple lateral loads acting on the active fluid element.

It is an advantage in one aspect of the present invention that the cartridge-like detachable active fluid element can be readily replaced, such as in the field or when refurbishment is required.

It is another advantage in another aspect that the cartridge-like active fluid element can be easily replaced to accomplish precise tuning of the active fluid mounting for different situations, and thus, allow use as an active fluid element in multiple different active mounting systems (different installations).

It is an advantage in another aspect that the flexible element within the passive mounting need not be changed to tune the volume stiffness of the active fluid mounting, because the volume stiffness is preferably independent of the passive mounting.

It is an advantage that the mass, spring stiffness, and volume stiffness associated with the piston in the present invention can be tuned such that energy consumption is reduced at a predominant operating frequency.

It is an advantage in another aspect of the present invention that it can be used as an active dynamic linkage, between for example a helicopter transmission and fuselage.

The abovementioned and further features, advantages and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 9a is a partially cross-sectioned side view of another embodiment of active fluid mounting, such as an active fluid pylon isolator, FIG. 9b is a enlarged and partially cross-sectioned side view of a portion of the piston assembly of the active fluid mounting in FIG. 9a, FIG. 9c is a partially cross-sectioned side view of a spring within the active fluid mounting of FIG. 9a and an electrical connections thereto, and FIG. 9d is an end view of the permanent magnets in FIG. 9a illustrating the slot formed therein.

DETAILED DESCRIPTION OF THE INVENTION

Figure 1:
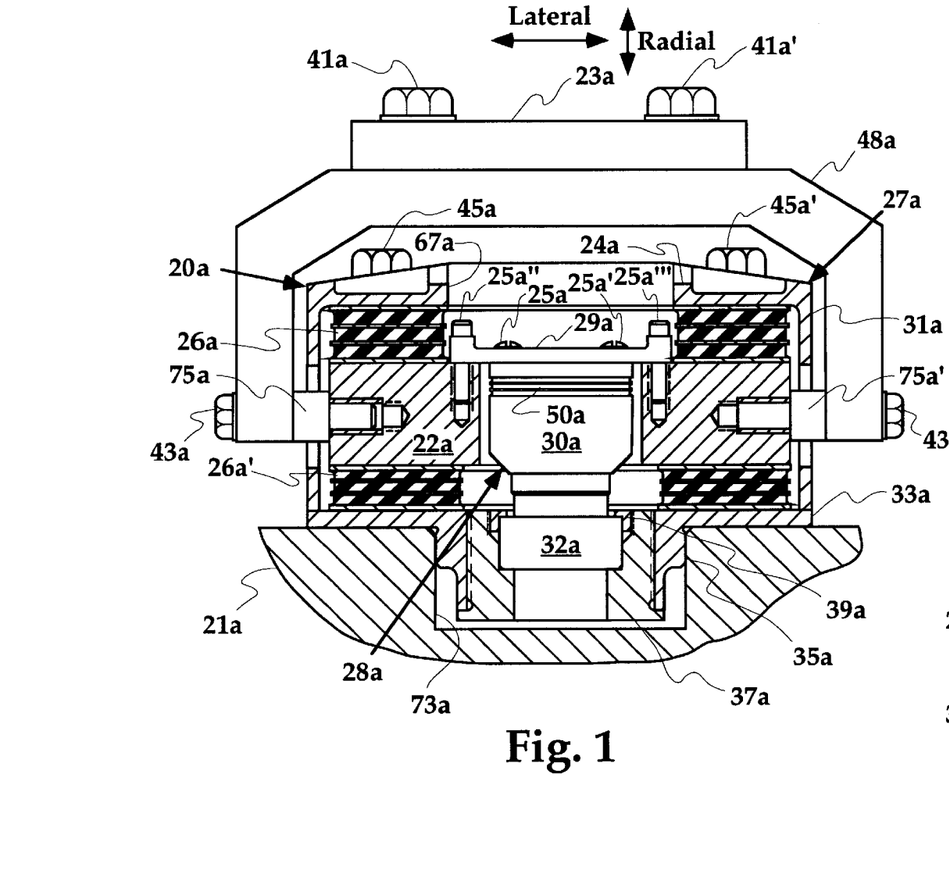
FIG. 1 is a partial cross-sectioned side view of a first embodiment of the present invention active fluid mounting including an active fluid element which is detachable, readily replaceable, unitary, cartridge-like and which includes an inductively-driven piston.

Referring now to the Drawings where like numerals denote like elements, in FIG. 1, shown generally at 20a, is a first embodiment of the active fluid mounting. The active fluid mounting 20a is useful for controlling, and preferably minimizing, dynamic vibration (motion and force) transmitted between a vibrating member 21a, such as an aircraft or automotive engine or the like, and a structure 23a, such as an aircraft pylon, automotive frame, or the like. The active fluid mounting 20a comprises a passive mounting 27a having an active fluid element 28a which includes a defined acting axis and is preferably received in a hollow pocket 67a preferably formed through the inner member 22a, outer member 24a, and first flexible element in the passive mounting 27a.

Within the passive mounting 27a an inner member 22a is attached to either the vibrating member 21a or structure 23a, while the outer member 24a attaches to the other of the vibrating member 21a and structure 23a. A first flexible element, preferably including compressive elastomer elements 26a, 26a' which are preferably substantially aligned with a radial direction, flexibly interconnects the inner and outer members 22a, 24a. Preferably, flexible elements 26a, 26a', are manufactured from laminated elastomer layers bonded to metal shims. Preferable elastomer materials for all elastomer sections described herein include natural rubber, synthetic rubber, blends of natural and synthetic rubber, silicone, and the like. Notably, passive mounting 27a acts as the primary isolator between structure 23a and vibrating member 21a and cartridge-like active fluid element 28a acts as a secondary isolator. The active fluid element 28a is arranged in parallel relationship with the passive mount 27a forming, in combination, what is referred to in this first embodiment as the active fluid mounting 20a.

The active fluid mounting 20a preferably includes within the hollow portion 67a preferably formed through the outer member 24a, inner member 22a, and flexible elements 26a, 26a', an active fluid element 28a which is unitary, cartridge-like, self-contained, and easily and readily detachable. It should be understood that this cartridge-like active fluid element 28a allows for fast change-out during refurbishment, and/or tuning, etc. Further, in a distinguishing feature, the active fluid element 28a does not derive any of its volume stiffness Kv (to be described later), from the first flexible elements 26a, 26a' and interconnects (preferably by fastening means, such as bolts and/or retainers) between inner and outer members 22a, 24a. As such, the active fluid element 28a can be tuned "separately" from the passive mounting 27a, thereby allowing the same active fluid element 28a to be used with different passive mountings, for example, in multiple platforms (applications).

A first cylindrically-shaped housing member 30a of the active fluid element 28a preferably attaches to the inner member 22a preferably by way of a third flexible member 50a, plate 52a (FIG. 2), rigid bracket 29a, and fasteners 25a, 25a', 25a", 25a'". The second housing member 32a of active fluid element 28a is secured to outer member 24a via insertion in a pocket formed in an end of threaded insert 37a. The second housing member 32a is preferably secured and attached in place by split retainer ring 39a which is threadedly received within end of insert 37a. Retainer 39a may not be required if adequate precompression of the active element 28a is achievable. Precompression ensures that second housing member 32a is in contact with outer member 24a throughout the ordinary load range.

Insert 37a is preferably threadedly received in an end of pilot 35a which is formed on the outer member 24a of passive mounting 27a. Pilot 35a is preferably received in an engine recess 73a. The outer member 24a is preferably manufactured from steel or aluminum and includes first and second halves 31a, 33a which are precompressed together and attached to vibrating member 21a, preferably by four engine bolts 45a, 45a' (the other two bolts are not shown). Inner member 22a is also preferably manufactured from steel and is bar-shaped, preferably attaches and interconnects to structure 23a by way of clevis 48a. Preferably, clevis bolts 43a, 43a', and spacers 75a, 75a', attach clevis 48a to inner member 22a. Structure bolts 41a, 41a' preferably attach clevis 48a to structure 23a. By way of example and not by limitation, the radial dynamic stiffness (compression stiffness) of passive mounting 27a shown would be about 70,000 lbf/in (12,258,876 N/m) at 250 Hz (250 1/s) at +/−0.0005 in (+/−0.0127 mm) input in compression (Radial Direction). Dynamic stiffness in the lateral direction is a factor of six or more less than radial, as the first elastomer members 26a, 26a' are loaded in pure shear in the lateral direction.

Figure 2:
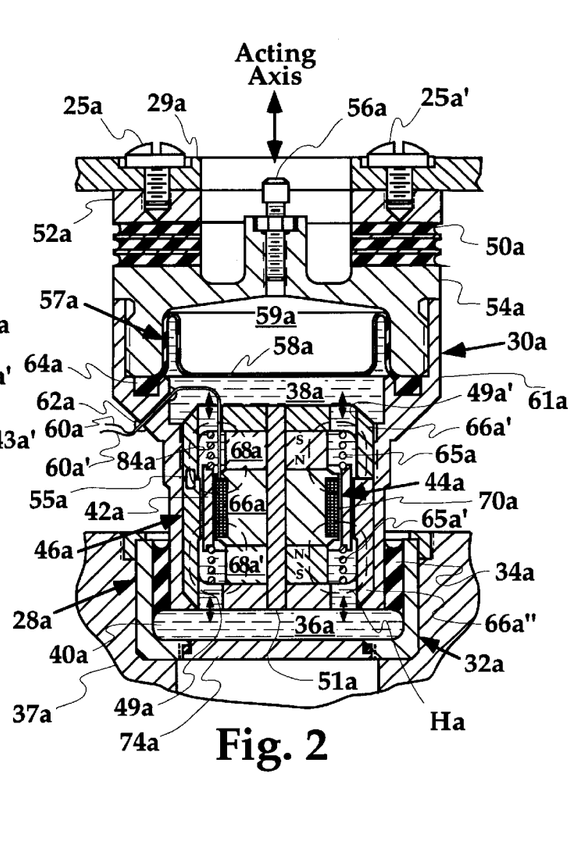
FIG. 2 is an enlarged cross-sectioned side view of an embodiment of the active fluid element shown in FIG. 1 which includes a motor unit therein.

As shown in FIG. 1 and FIG. 2, the active fluid element 28a further comprises first housing member 30a, second housing member 32a, and a second flexible element 34a, such as the elastomeric tube form shown, for flexibly connecting first housing member 30a to second housing member 32a. The second flexible element 34a accommodates motion predominantly in the axial direction, yet substantially restrains radial motion. Notably, second flexible element 34a will accommodate limited angular and radial misalignment. By way of example, and not by limitation, the second flexible element 34a is preferably an annular shaped tube-form elastomer section and exhibits a dynamic axial stiffness of about 10,500 lbf/in (1,838,831 N/m) at 250 Hz (250 1/s) and +/−0.0005 in (+/−0.0127 mm).

The active fluid element 28a preferably includes at least one, and preferably two, first and second fluid chambers 36a, 38a within said active fluid element 28a each having a defined volume stiffness Kv associated therewith. By the term defined "volume stiffness" Kv, it is meant that when all passages to and from the chamber in question are blocked off, an increase in pressure therein will cause a measurable increase in volume of the chamber. Specifically, chambers that have a flexible compliance associated therewith, such as an elastomer element, will exhibit a volume stiffness Kv.

By way of example, and not to be considered limiting, the first fluid chamber 36a would exhibit a volume stiffness Kv of about 172,000 psi/in$^3$ (74,114 pascals/mm$^3$) and second fluid chamber 38a would exhibit a volume stiffness of about 500 psi/in$^3$ (215 pascals/mm$^3$) or less. Preferably, the volume stiffness Kv of the second fluid chamber 38a would be "substantially", a factor of a hundred or more, less than the volume stiffness Kv of the first fluid chamber 36a and, therefore, can be neglected in all calculations. In all embodiments, a substantially preferably electrically nonconductive and preferably incompressible fluid 40a, such as a perfluorinated polyether, silicone fluid, hydraulic oil, or the like, is contained within, and substantially fills, the first and second fluid chambers 36a, 38a. By "substantially incompressible" it is meant that the fluid 40a exhibits a bulk modulus (stiffness) of about 350,000 psi/in$^3$ (150,815 pascal/mm$^3$).

A piston 42a, which in this embodiment is preferably a hollow-cylindrical sleeve, i.e., ring-like, is contained within the active fluid element 28a and dynamically interacts with the fluid 40a in the first and said second fluid chambers 36a, 38a to cause dynamic pressure variations therein. This produces active dynamic forces which act between the inner member 22a and outer member 24a to control vibration therebetween. The piston 42a is inductively-driven and is preferably manufactured from a high density nonmagnetic material with high electrical conductivity, such as copper or brass.

It should be understood that the area of action of the piston 42a is preferably substantially smaller than the area of the fluid pumping chambers 36a, 38a, therefore, the forces generated by driving the piston 42a can be significantly amplified, i.e., fluidically leveraged. Preferably, in this embodiment including the inductively-driven piston 42a, the amplification ratio or mechanical advantage MA is given by the approximate relationship:

$$MA = Ap/Ar \qquad \text{Eqn. 1}$$

Where:

Ap is the pumping area of the first fluid chamber 36a in (in$^2$) or (m$^2$), and Ar is the pumping area (at the terminal ends) of the inductively-driven piston 42a in (in$^2$) or (m$^2$).

MA should preferably be about 15 or more. In this fashion, the force created by the motor unit 46a is amplified or leveraged by about 20 times or more.

The active fluid element 28a further includes means for driving said piston 42a housed internally within it. The means for driving the piston 42a preferably includes a coil 70a and magnet-and-pole assembly 44a which is further comprised of at least one permanent magnet, and preferably two permanent magnets 68a, 68a' and pole pieces 66a, 66a', 66a". Wound coil 70a is preferably manufactured from wound copper magnet wire of the appropriate size and number of winds to produce a dynamic magnetic field of an acceptable flux strength. Permanent magnets 68a, 68a' preferably have north N and south S poles oriented as shown in FIG. 2 and are preferably ring-type Neodymium-type, iron-boron, or other high strength magnets. The magnets 68a, 68a' cause a static magnetic field to be generated in the gap between inner pole 66a and outer pole 66a" (which is filled by the piston 42a and coil 70a) which have lines of flux that act across the gap. Energizing coil 70a with an alternating electrical current causes (induces) current to flow in the hoop direction (circumferentially) about the nonmagnetic and conductive ring-like piston 42a because of the close proximity of piston 42a to coil 70a. The oscillating induced current flowing in the piston 42a creates a dynamically oscillating magnetic field which interacts with the static magnet field created by magnets 68a, 68a' and the dynamic magnetic field created by alternately energizing coil 70a. This causes the piston 42a to be driven axially (along the acting axis). It should be noted, that regardless of the direction or axial location of the piston 42a relative to the coil, a force can be generated to either further assist or further retard the motion of piston 42a. This is an advantage over solenoid devices, such as taught in U.S. Pat. No.

5,439,082 to McKeown, which can only pull the mass into the coil, and, therefore, cannot assist the motion in a positive axial direction when the tunable slug is outside the coil. The piston 42a is preferably centered relative to poles 66a, 66a" by precompressed centering springs 65a, 65a', which are preferably helical steel coil springs, or the like. Preferably, the piston 42a is included in an intermediate fluid chamber 84a which is fluidically interactive with the first and second fluid chambers 36a, 38a through ports 49a, 49a'. Preferably, the magnets and pole pieces are slotted radially to minimize eddy currents from flowing tangentially.

By way of example, and not to be considered limiting, the weight of piston 42a in this embodiment is about 0.0224 lbf (0.0996 N) and the combined static stiffness of centering springs 65a, 65a' are preferably less than about 5.0 lbf/in (875 N/m). It should be understood that the mass of piston 42a, inertia of the fluid If, volume stiffness Kv of first fluid chamber, and axial stiffness of springs 65a, 65a', piston area Ap and ring area Ar, amongst other factors, may be appropriately chosen, such that the piston 42a will resonate at a particular design frequency fnat (to be fully described later herein).

In particular, the masses, stiffnesses, and areas would be chosen such that the resonance of piston 42a occurs at a frequency preferably about 1.5 to 3 times higher than the highest frequency of vibration which is to be controlled. The resonant frequency fnat of the active fluid mounting 20a is preferably predominantly governed only by the volume stiffness Kv of the first flexible member 34a and mass of piston 42a and the Ap/Ar ratio. This is because the inertia of the fluid If in ports 49a, 49a' (preferably six per end) is preferably made negligible. Further, the stiffnesses of centering springs 65a, 65a' are preferably made negligible, and the volume stiffness Kv2 of second fluid chamber 38a is substantially less than the volume stiffness Kv1 of the first fluid chamber 36a. Therefore, the volume stiffness Kv2 of the second fluid chamber 38a, spring stiffnesses Ks of centering springs 65a, 65a' and fluid inertia If may be ignored in calculations.

In terms of performance, this actively driven element 28a will produce about +/−35 lbf (155 N) at about 250 Hz (250 1/s) and 0.0005 in (0.0127 mm) axial displacement when installed in passive mounting 27a but may produce forces as high as 92 lbf. (409 N). The performance is dictated by the current Ir that is induced into the inductively driven piston 42a. The following equations and examples are indicative of the process used to size, for example, active fluid element 28a including an inductively-driven piston 42a. It should be understood that the values listed are exemplary only, and not to be considered limiting. The force Fp acting on the piston 42a is given by the approximate relationship:

$$F_p = \alpha_m * I_c \text{ (lbf) or (N)} \qquad \text{Eqn. 2}$$

where:
$\alpha_m$ is the force constant in (Lbf/Amp) or (N/Amp), and
$I_c$ is the electrical current in the coil 70a in (Amp).
$\alpha_m$, the force constant, is given by the approximate relationship:

$$\alpha_m = B_g 0.0057 \frac{I_r}{I_c} \pi \frac{ID_r + OD_r}{2} (Lbf/\text{Amp}) \text{ or } (N/\text{Amp}), \qquad \text{Eqn. 3}$$

where:
Bg is flux density in the gap in (Tesla),
Ir is the current induced in the piston 42a in (Amp),
IDr is the inside diameter of piston 42a in (in) or (m), and
ODr is the outside diameter of piston 42a in (in) or (m).

The current Ic flowing in the coil 70a induces current Ir to flow in the piston 42a in the frequency range of concern according to the approximate relation:

$$I_r = \frac{I_c N_c E_{rc}}{1} \text{ (Amp)} \qquad \text{Eqn. 4}$$

where:
$N_c$ is the total number of turns in the coil 70a (approx. 260),
$E_{rc}$ is the efficiency of coupling of piston 42a and coil 70a (approx. 0.90)

The flux density Bg in the gap is given by the approximate relationship:

$$B_g = ft \left\{ \frac{B_r}{\frac{\sigma A_g}{A_m} + \frac{\upsilon_r f L_g}{L_m}} \right\} \text{ (Tesla)} \qquad \text{Eqn. 5}$$

where σ is given by the approximate relation:

$$\sigma = \frac{A'_g}{A_g} \qquad \text{Eqn. 6}$$

and where:
ft is an adjustment factor based on test data (approx. 0.656),
Br is the remnant flux density (approx. 1.14) in (Tesla),
σ is a factor related to magnetic leakage (approx. 1.192),
$A_m$ is the permanent magnet area (approx. 0.886 in$^2$) (571 mm$^2$),
Ag is the area of the magnetic gap (approx. 0.606 in$^2$) (390 mm$^2$),
A'g is the area of magnetic gap accounting for leakage losses (approx. 0.732 in$^2$) (472 mm$^2$),
$\upsilon_r$ is the recoil permeability related to the pole piece material (approx. 1.1),
f is the magnet operating factor (approx. 1.0),
$L_m$ is the length of magnet in poled direction (approx. 0.125 in) (3.18 mm), and
$L_g$ is the length of gap magnetic flux must jump (approx. 0.123 in) (3.12 mm).

Given all this above, the maximum force Fa from the active element 28a is approximated by:

$$Fa = MA \; Fp = MA \; \alpha_m Ic \text{ (lbf) or (N)} \qquad \text{Eqn. 7}$$

However, the maximum force Fa that can be achieved for continuous operation will generally be dictated by temperature considerations. In other words, to prevent overheating of the active fluid element 28a, the current Ic to the coil 70a must be limited. Through an experimental investigation of heat transfer, it was determined that the maximum coil current Ic could be 3.4 Amps peak for continuous use, assuming minimal eddy currents. Therefore, the maximum temperature stable force output Fa, including inertial effects, is approximately 120 lbf (533 N). However, it should be understood that the actual actuator force can be significantly amplified by the resonant effects and tuning the resonance to amplify forces at the desired operating frequency. Further, higher output forces are available for reacting to larger transient vibrations.

The dynamic volume stiffness Kv'1 of the first fluid chamber 36a of the active fluid element 28a is given by the approximate relation:

$$K'_{v1} = \frac{1}{\frac{V_f}{B_f} + \frac{t^3 \pi (ID_t + t)}{8G'L_t}} \quad (\text{psi/in}^3) \text{ or } (\text{pascal/m}^3) \quad \text{Eqn. 8}$$

where:
- G' is the dynamic shear modulus of the elastomer (approx. 300 Lbf/in$^2$) (2,068 Kpa),
- $L_t$ is the length of the tube-form elastomer 34a (approx. 0.50 in) (12.7 mm),
- $Id_t$ is the inside diameter of tube-form elastomer 34a (approx. 0.73 in) (18.5 mm),
- t is the thickness of tube form elastomer 34a (approx. 0.09 in) (2.29 mm),
- $V_f$ is the volume of fluid in the first fluid chamber 36a (approx. 0.43 in$^3$) (7,046 mm$^3$),
- $B_f$ is the bulk modulus of fluid 40a in first fluid chamber 36a (approx. 150,000 lbf/in2) (1,034 Mpa).

The weight of the inductively driven piston 42a is approximately given by:

$$W_r = \rho_{wd} \, H_r \frac{\pi}{4}(OD_{r}^2 - ID_{r}^2) \quad (lbf) \text{ or } (N)$$

where:
- $ID_r$ is the inside diameter of piston 42a (approx. 0.648 in) (16.46 mm),
- $OD_r$ is the outside diameter of inductively driven piston 42a (approx. 0.730 in) (18.54 mm),
- $\rho_{wd}$ is the density of copper (approx. 0.332 lbf/in$^3$) (0.09 N/cm$^3$), and
- $H_r$ is the height of piston 42a (approx. 0.786 in) (19.96 mm).

The fluid inertia If in the flow ports 49a, 49a' located between the piston 42a and the first and second fluid chambers 36a, 38a adds to the effective mass of the piston 42a and must be considered in all dynamic calculations (although it may be made negligible via appropriate design). The fluid inertia If is dependent on the diameter d of the ports 49a, 49a', their length Lport, and the density pf of the fluid 40a and is given by the approximate relations:

$$I_f = \frac{\rho_f L_{port}}{g A_{port}} \quad (lbf - s^2/in^5) \text{ or } (N-s^2/m^5) \quad \text{Eqn. 10}$$

and $$A_{port} = N_{ports} \frac{\pi}{4} d^2 \quad (in^2) \text{ or } (m^2) \quad \text{Eqn. 11}$$

where:
- d is the diameter of fluid ports 49a, 49a' (approx. 0.164 in) (4.16 mm),
- g is the gravitational constant (approx. 386 in/s$^2$) (9.81 m/s$^2$),
- $A_{port}$ is the area of fluid ports 49a, 49a', (approx. 0.253 in$^2$) (163 mm$^2$),
- $L_{port}$ is the length of each port 49a, 49a' connecting first and second fluid chambers 36a, 38a to the intermediate chamber 84a (approx. 0.18 in) (4.57 mm),
- $N_{ports}$ is the total number of fluid ports (approx. 6 ports for each end for a total of 12), and
- $\rho_f$ is the fluid density (approx. 0.034 lbf/in$^3$) (0.0092 N/cm$^3$).

The resonant frequency fnat of inductively driven piston 42a must be placed well above the operating frequency $f_o$ of the active fluid mounting 20a, which, for this example, is approximately 255 Hz (255 1/s). The following approximate represents the undamped natural frequency fnat of the piston 42a assuming that Kv'2 is negligible.

$$f_{nat} = \frac{1}{2\pi} \sqrt{\frac{K'_{v1}}{I_{fp} + \left(\frac{W_r + \frac{W_s}{2}}{A_{r2} g}\right)}} \quad \text{Hz or } (1/s) \quad \text{Eqn. 12}$$

where:
- f nat is the calculated natural frequency of piston 42a (approx. 625 Hz) (625 1/s),
- $K'_{v1}$ is the dynamic volume stiffness of first fluid chamber 36a (approx. 172,000 psi/in$^3$) (74.1 Kpa/mm$^3$),
- $I_{fp}$ is the fluid inertia in all ports 49a, 49a' (approx. 0.000125 lbf-s$^2$/in$^5$) (0.00000525 N-s$^2$/cm$^5$),
- $W_r$ is the weight of piston 42a (approx. 0.0224 lbf) (0.0996 N),
- $W_s$ is the weight of centering springs 65a, 65a' (approx. 0.0002 lbf) (0.00089 N), and
- $A_r$ is the area of piston 42a at terminal ends (approx. 0.089 in$^2$) (57.42 mm$^2$).

The best performance for this type of active fluid element 28a is obtained when operating at or near the "notch" of the complex stiffness curve, K*. When the inertia of the inductively driven piston 42a and the fluid 40a in the ports 49a, 49a' are amplifying forces out the coil and magnet assembly 44a by reducing the effective stiffness, improved dynamic performance is achieved. The "notch frequency" f notch is preferably placed near the operating frequency, in this example, approx. 255 Hz (255 1/s), to achieve the best performance there, while still being able to achieve good, but less efficient, performance at lower operating frequencies.

To determine the undamped notch frequency f notch, the spread variable n must be obtained. The variable n is multiplied by the natural frequency fnat to determine the "notch" frequency. To get a wide notch in the frequency domain, the spread variable n, which indicates the distance between the notch and the resonance, should preferably be less than 0.80. n is given by the approximate relation:

$$n^2 = \frac{K'_m + K'_t}{K'_m + K'_t + (K'_{v1} A_p^2)} \quad \text{Eqn. 13}$$

where:
- n is the spread variable (approx. 0.40),
- $K'_m$ is the dynamic radial stiffness of the passive mounting 27a (approx. 70,000 lbf/in) (12,609 N/mm),
- K't is the axial dynamic stiffness of the first flexible element 34a (approx. 8,110 lbf/in) (1,420 N/mm),
- $K'_{v1}$ is the dynamic volume stiffness of first fluid chamber 36a (approx. 172,000 psi/in$^3$) (74.115 Kpa/mm$^3$), and
- $A_p$ is the pumping area of first fluid chamber 36a (approx. 1.887 in$^2$) (1,217 mm$^2$).

The "notch" frequency $\omega_{notch}$ is then given by the approximate relation:

$$f \, notch = n \, f \, nat \quad \text{Eqn. 14}$$

where:

f notch is the notch frequency (approx. 250 Hz) (250 1/s), and f nat is the natural frequency (approx. 625 Hz) (625 1/s).

In this embodiment, the piston 42a interacts with first and second fluid chambers 36a, 38a via fluid ports 49a, 49a'. Preferably, fluid inertia in ports will be minimized as compared to the mass of piston 42a. However, in some cases, it may be desirable to tune the fluid inertia in ports 49a, 49a' as well as the mass of piston 42a to provide the tuned notch.

In this embodiment, and in another novel aspect, the coil 70a and magnet-and-pole assembly 44a is included entirely within a drop-in motor unit 46a. The motor unit 46a is an integral unit which can be easily and quickly changed out. This is desirable, as it allows ease of refurbishment as well as the ability to test multiple motor concepts and allows ease of tuning. The motor unit 46a is preferably comprised of two permanent magnets 68a, 68a', a slender nonmagnetic alignment rod 51a for axial alignment, an inductively-driven conductive and nonmagnetic piston 42a, low-stiffness coil centering springs 65a, 65a', a wound copper wire coil 70a, high magnetic permeability pole pieces 66a, 66a', 66a'', and locating pin 55a for maintaining rotational alignment.

The magnetic circuit, which carries magnetic flux, is defined by pole pieces 66a, 66a', 66a'', which are manufactured from high magnetic permeability material, such as steel, but which is preferably a highly electrically resistive material also, and high strength permanent magnets 68a, 68a'. The magnetic circuit is preferably substantially entirely contained within the motor unit 46a. Notably, there may be some stray magnetic flux outside of the confines of the magnetic circuit. The magnetic fields Ha are approximated by the dotted flux lines shown. Electrical leads 60a, 60a' provide alternating electrical current to the wound wire coil 70a to dynamically energize same. Lead 60a is sealed via lead seal 62a, which is formed of a potting material, a sealed electrical connector, a bonded seal, or the like, and prevents the fluid 40a from leaking out. Removable and sealed fill plug 74a is used for filling the active fluid element 28a with fluid 40a and for access when bonding second flexible element 34a.

The active fluid element 28a also, preferably, includes a volume compensator 57a which includes a flexible partition 58a, an air chamber 59a, and a fill valve 56a. The flexible partition 58a is preferably an elastomer diaphragm which includes a flexible periphery seal 64a formed thereon which is compressed upon assembly of threaded cap 54a into body 61a to seal same. Cap 54a and body 61a, together, make up the first housing member 30a. The air chamber 59a is preferably filled with a compressible gas, such as air or nitrogen, to a sufficient predetermined positive prepressure. This positive prepressure is thought to prevent cavitation of the fluid 40a upon dynamic actuation (driving) of the piston 42a under certain higher amplitude or force conditions. Volume compensator 57a also allows expansion of the fluid 40a due to changes in temperature, thereby minimizing pressure buildups within the active fluid element 28a which may change the properties of the active fluid element 28a or even cause rupture of the second flexible element 34a. A volume compensator is described in commonly assigned U.S. Pat. No. 4,811,919 to Jones.

Preferably, third flexible element 50a is included which functions to decouple lateral loads from the active fluid element 28a. The third flexible member 50a is preferably manufactured from laminated elastomer layer and metal shims, and is preferably bonded directly to both cap 54a and plate 52a. Plate 52a is preferably attached to bracket 29a by fasteners, 25a and 25a'. Preferably, the third flexible member 50a is very stiff in the direction of the acting axis and substantially less stiff along the lateral axis. This allows the active fluid element 28a to effectively transmit dynamic loads along the radial (acting) axis, yet be able to accommodate lateral displacements applied to the passive mounting 27a thereby reducing lateral loading. Likewise, second elastomer section 34a allows axial displacement because of compressive loads applied to first elastomer sections 26a, 26a'.

By way of example, and not to be considered limiting, the third flexible member 50a would preferably have a stiffness in the direction of the acting axis of about 450,000 lbf/in (78.8 MN/m) and a lateral stiffness of about a factor of a hundred less (approx. 4,500 lbf/in or less) (788.1 KN/m) and is manufactured from natural rubber, synthetic elastomer, blends of natural and synthetic, and silicone elastomer, or the like. It should also be understood, that although shown in the environment of active fluid element 28a, the novel inductively driven piston arrangement described herein can be incorporated in any active fluid mounting. For example, the motor unit 46a may be interchanged with the motor unit 46f of FIG. 9a.

Figure 3:
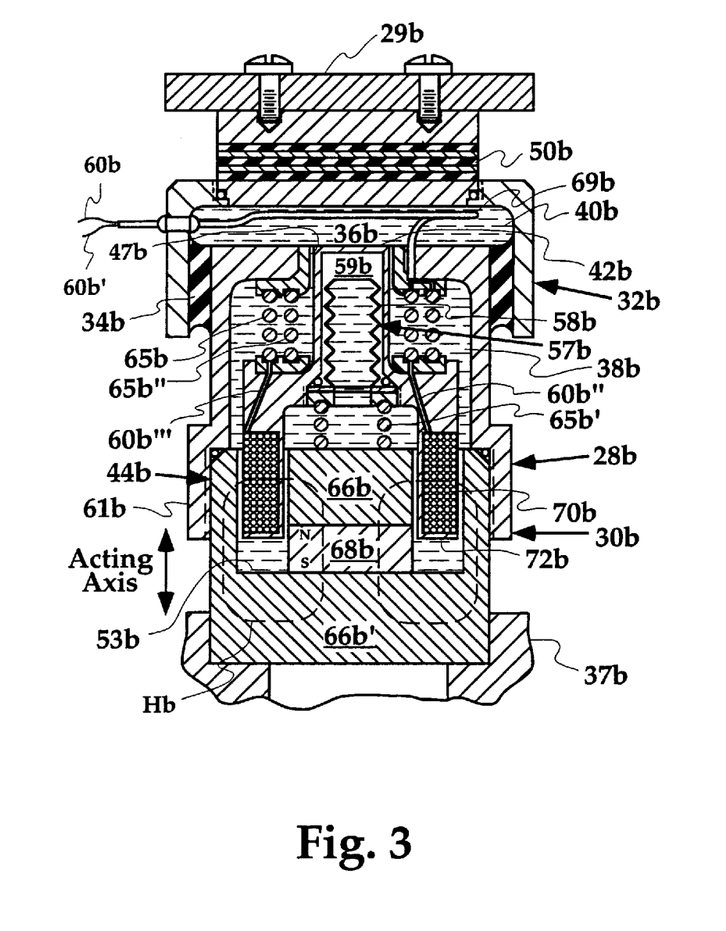
FIG. 3 is an enlarged cross-sectioned side view of an alternate active fluid element including a piston with an axial projection received in a bore and which moves directly along with the wound coil.

In FIG. 3, another embodiment of active fluid element 28b is illustrated which includes a first housing member 30b, second housing member 32b, second flexible element 34b and is attached between bracket 29b and insert 37b. It should be understood that this embodiment may be installed within hollow portion 67a in passive mounting 27a (FIG. 1) with only minor modifications to bracket 29a and insert 37a to accommodate the size changes. In this embodiment, the piston 42b includes a rod-like protrusion which is slidably received in a bore 47b. The piston 42b is loosely fit in the bore 47b and the dimensions are such that only a small amount of fluid 40b can flow through the gap therebetween. Therefore, dynamic oscillation of piston 42b, effectively and efficiently creates dynamic pressure variations within first fluid chamber 36b and second fluid chamber 38b. The piston 42b is preferably integral with, and directly attached to, bobbin 72b which has a wound coil 70b of magnet wire thereon. The piston 42b and bobbin 72b comprise an assembly, preferably made of one-piece construction, and manufactured from a nonmagnetic material, such as aluminum or plastic.

Magnet-and-pole assembly 44b includes a disc-shaped permanent magnet 68b and poles 66b, 66b'. Pole 66b' has a recess 53b formed therein for receiving at least a portion of annular-shaped coil 70b and bobbin 72b. Magnet-and-pole assembly 44b is preferably received and retained in a recessed pocket formed on the end of insert 37b. A retaining ring may not be required if there is sufficient axial precompression of the active fluid element 28b along its acting axis. Together, magnet-and-pole assembly 44b and coil 70b make up the coil and magnet assembly 44b. First housing member 30b is comprised of magnet-and-pole assembly 44b and body 61b. Preferably, magnet-and-pole assembly 44b is threaded onto cylindrical body 61b, which is preferably manufactured from nonmagnetic material. Puck-shaped pole piece 66b, cup-shaped pole piece 66b' are manufactured from a high magnetic permeability material. Together, pole pieces 66b, 66b', magnet 68b, and coil 70b comprise the magnetic circuit. A portion of the magnetic field Hb is approximately illustrated by the dotted magnetic flux lines shown.

Three centering springs 65b, 65b', 65b'' preferably center and flexibly suspend the piston 42b and its integral wound coil 70b. The driving electrical current is received through leads 60b, 60b' and channeled into wound coil 70b through incoming path, comprising spring 65b" and incoming lead 60b" and out through outgoing path, comprising outgoing lead 60b'" and spring 65b. The terms "incoming" and "outgoing" are merely illustrative, as it should be understood that current through lead 60b, 60b' is preferably Alternating Current (AC). Channeling electrical current through springs 65b, 65b" is preferable to minimize dynamic fatigue of leads connecting to moving coil 70b. Commonly assigned U.S. Pat. No. 5,323,133 to Heath et al. describes a "Method And Apparatus For Making Electrical Connection With A Moveable Member." A strain relief loop 69b may be used to prevent of fatigue of leads 60b, 60b'.

Second and third flexible elements 34b, 50b, serve the same purposes as described with reference to the aforementioned FIG. 2 embodiment. Tunable volume stiffness Kv2 of second fluid chamber 38b is provided by flexible partition 58b, such as flexible steel bellows shown. The volume compensator 57b comprises air chamber 59b and flexible partition 58b. In general, the volume stiffness Kv2 provided by the flexible partition 58b is substantially less than the volume stiffness Kv1 of the first flexible member 34b. The mass of piston 42a, coil 70b and bobbin 72b assembly, and stiffness of centering springs 65b, 65b', 65b", and volume stiffness Kv1 of the first flexible member 34b are preferably tuned to provide the appropriate position of the notch f notch.

Figure 4:
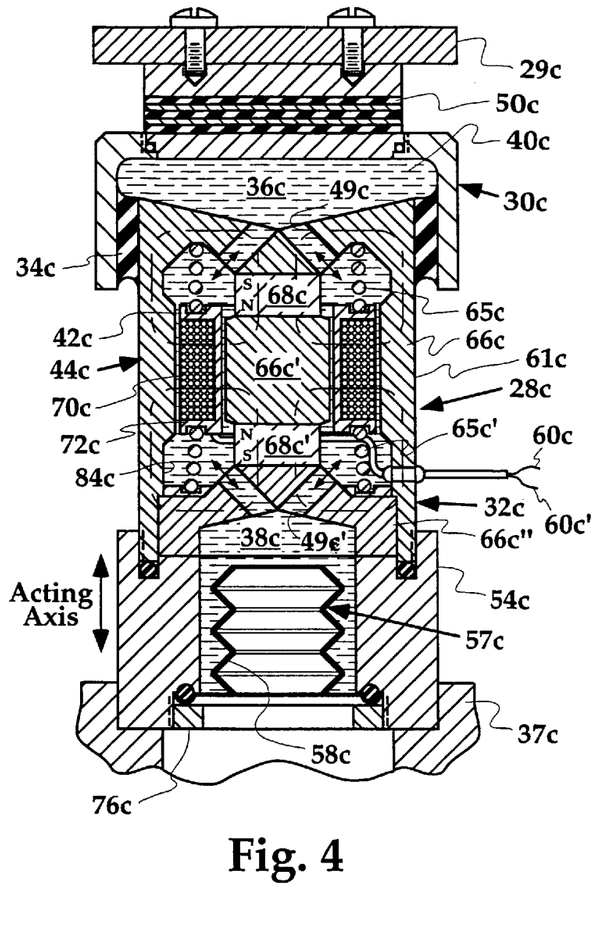
FIG. 4 is an enlarged cross-sectioned side view of another embodiment of active fluid element wherein the piston is comprised of a coil circumferentially wound about a bobbin.

FIG. 4 illustrates another embodiment of active fluid element 28c which comprises first and second housing members 30c, 32c flexibly interconnected by second flexible element 34c, first and second fluid chambers 36c, 38c, an annular-shaped piston 42c interacting with fluid 40c contained within first and second fluid chambers 36c, 38c, preferably through ports 49c, 49c' and including means for driving the piston 42c. In this embodiment, the piston 42c is comprised of bobbin 72c, which is preferably nonmagnetic and manufactured from aluminum or plastic, and a number of hoop winds of copper wire comprising a wound coil 70c. Piston 42c is preferably centered and supported relative to pole pieces 66c, 66c' by coil centering springs 65c, 65c' which are preferably axially-precompressed.

Magnet-and-pole assembly 44c is comprised of pole pieces 66c, 66c', 66c" and a plurality of opposed permanent magnets 68c, 68c'. Second housing member 32c is comprised of body 61c and threaded cap 54c. Body 61c is further comprised of pole pieces 66c, 66c' and 66c" and magnets 68c, 68c', which comprise the complete magnetic circuit. Cap 54c is preferably manufactured from a nonmagnetic material, such as brass or aluminum and is received in recessed pocket in insert 37c which is inserted in passive mounting 27a as shown in FIG. 1. Cap 54c threads onto body 61c and secures pole piece 66c" in place, seals the interface, and precompresses centering springs 65c, 65c' which properly centers the piston 42c. Volume compensator 57c provides the second volume stiffness Kv2 to second fluid chamber 38c and allows for fluid expansion and pressurization. Preferably, threaded ring retainer 76c secures flexible partition 58c (preferably a flexible steel bellows) in place. Decoupler 50c provides lateral decoupling of loads applied by inner member 22a of passive mounting 27a (FIG. 1) to bracket 29c. The active fluid element 28c is tuned by adjusting the mass of the coil 70c and bobbin 72c, inertia of the fluid 40c contained in ports 49c, 49c', stiffness of centering springs 65c, 65c', and volume stiffness Kv1 of the first flexible member 34c. The volume stiffness Kv2 of second fluid chamber 38c is assumed to be negligible in this embodiment.

Energizing leads 60c, 60c' with electrical current and, thereby, supplying electrical current to wound coil 70c causes piston 42c to dynamically oscillate, as commanded, along an acting axis within intermediate chamber 84c and pump fluid 40c into and out of ports 49c, 49c' and into and out of first and second fluid chambers 36c, 38c. This causes fluid pressures to act inside the active fluid element 28c and produce axially-acting active oscillatory forces between bracket 29c and insert 37c.

Figure 5:
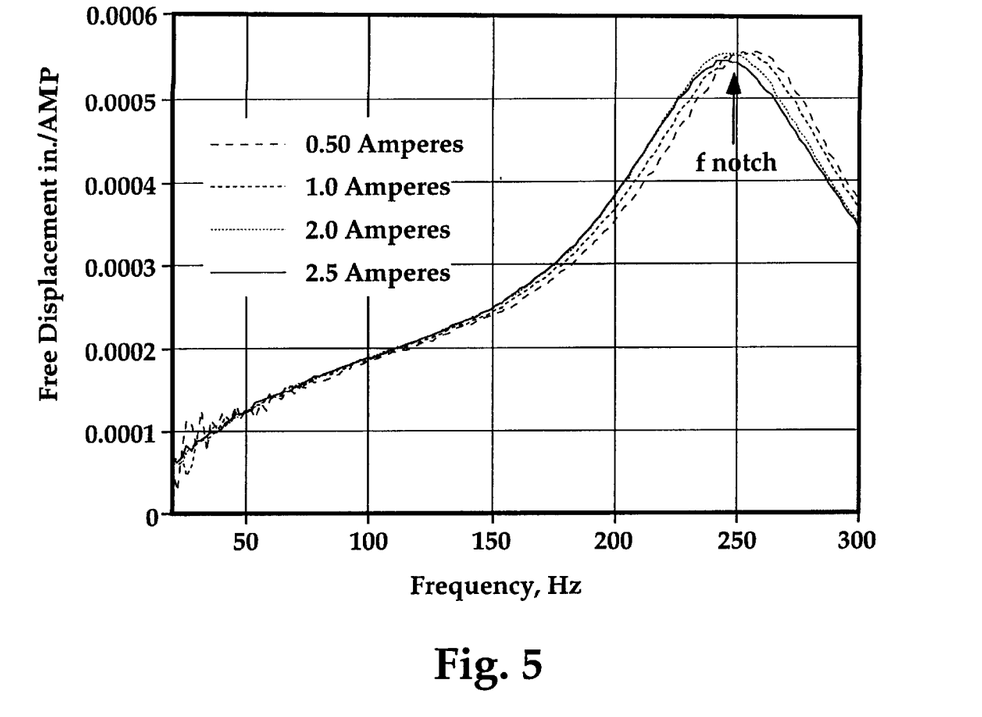
FIG. 5 is a graphic illustration of representative output performance of the active fluid mounting illustrated in FIG. 1.

FIG. 5 illustrates a representative performance curve of the active fluid mounting 20a of the embodiment shown in FIG. 1 including therein the active fluid element 28a described with reference in FIG. 2. The graphical plot illustrates dynamic free displacement (when installed between the inner member and outer member of the active fluid mounting in the radial direction) in in/Amp (m/Amp) versus frequency in Hz (1/s). A family of normalized curves is shown for various amperage inputs to the coil. It should be readily understood that the active fluid element 28c is very efficient to operate at its tuned frequency f notch (approx. 245–255 Hz) (245–255 1/s) depending upon input condition. This is attributable to the tuned resonance of the fluid 40a and piston 42a within the active fluid element 28a which amplify forces obtainable at the notch frequency f notch.

Figure 6:
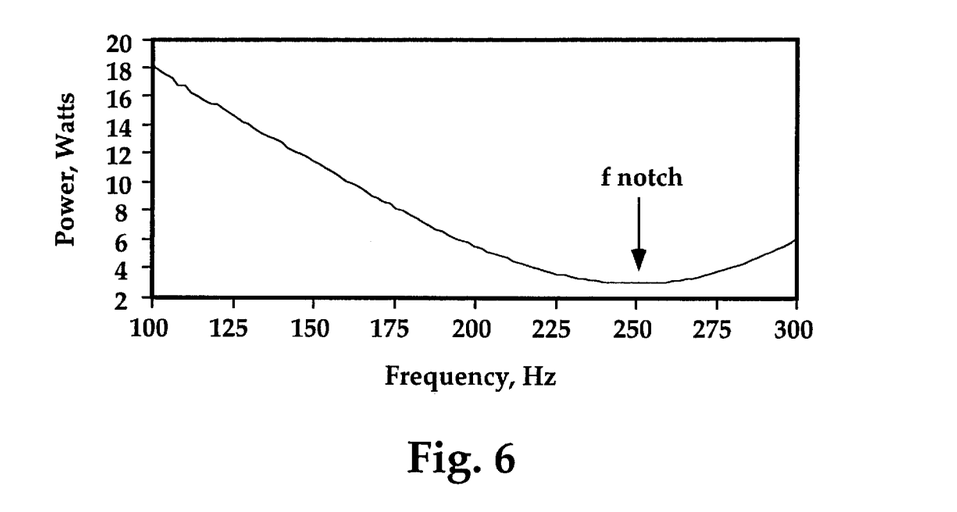
FIG. 6 is a graphic illustration of representative power requirements of the active fluid mounting of FIG. 1 at various frequencies.

FIG. 6 illustrates a representative power curve of the active fluid mounting 20a and graphically illustrates that the active fluid element 28a only requires a small power input (approx. 0.00537 hp) (4 Watts) (to operate at, or near, the tuned frequency (approx. 255 Hz) (255 1/s) at +/−0.0005 in (+/−0.0127 mm) free displacement. This results in a dynamic force output of about +/−35 lbf (155.7 N) at the notch frequency f notch at that particular amplitude. It should be understood that even at other frequencies away from the notch frequency f notch, the active fluid element 28a is still relatively efficient, as the notch frequency f notch of the active fluid element 28a improves performance even at other frequencies. It should also be understood that the active fluid element 28a may be driven at multiple frequencies at once. For example, the notch frequency f notch can be tuned at an N2 frequency of an aircraft engine, such that the active fluid mounting 20a is most efficient there, and the active fluid mounting 20a would still be relatively efficient at N1 (approx. 120 Hz). Furthermore, the active fluid element can produce approx. 90 lbf (400.3 N) at 250 Hz (250 1/s) on a semi-sustained basis, if needed to counter transient vibrations, etc.

Figure 7:
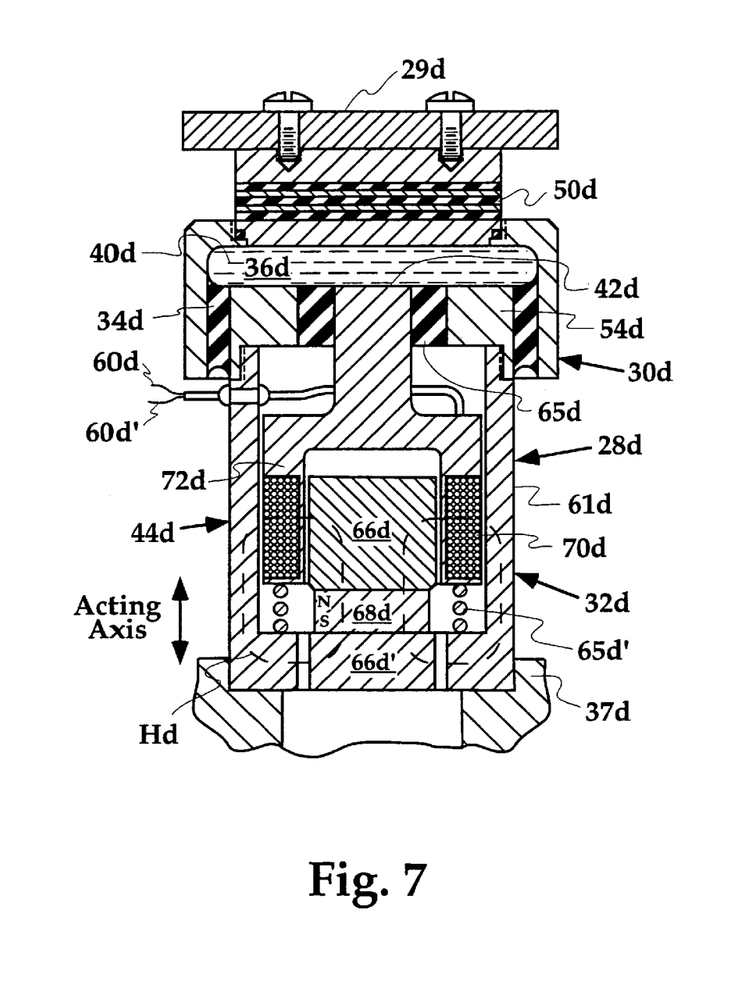
FIG. 7 is an enlarged cross-sectioned side view of another embodiment of active fluid element including a single fluid chamber.

FIG. 7 illustrates another embodiment of active fluid element 28d which comprises first and second housing members 30d, 32d, second flexible element 34d, a single fluid chamber 36d, a piston 42d interacting with fluid 40d contained therein, and including electromagnetic means for driving the piston 42d. In this embodiment, the piston 42d is part of an assembly which is comprised of a bobbin 72d, which is preferably nonmagnetic and manufactured from aluminum, plastic, or the like, and a number of hoop winds of copper wire comprising a wound coil 70d. The piston 42d is preferably centered and supported by centering springs 65d, 65d'. Preferably spring 65d is an annular-shaped tubeform elastomer section and provides part of the volume stiffness Kv1 of first fluid chamber 36d.

Magnet-and-pole assembly 44d is comprised of at least one permanent magnet 68d and pole pieces 66d, 66d'. Second housing member 32d is preferably comprised of body 61d and threaded cap 54d. Body 61d is further comprised of pole pieces 66d and 66d', and magnet 68d which comprise the magnetic circuit. Cap 54d is preferably manufactured from a nonmetallic material, such as aluminum. Cap 54d threads onto body 61d which precompresses centering spring 65d', which properly centers and positions piston 42d relative to pole pieces 66d, 66d'. The active fluid element 28d is preferably tuned by adjusting the masses of the piston 42d, coil 70d and bobbin 72d, dynamic axial stiffness of centering springs 65d, 65d', dynamic volume stiffness Kv1 of the first flexible member 34d.

Energizing leads 60d, 60d' with electrical current and, thereby, supplying electrical current (AC) to the wound coil 70d causes the piston 42d to dynamically oscillate (because of interaction of static field produced by disc-shaped permanent magnet 66d and dynamic field produced by coil 70d), as commanded, and compress the fluid 40d in first fluid chamber 36d. This causes fluid pressure variations to act inside the active fluid element 28d and produce active dynamic forces between bracket 29d and insert 37d. Preferably, third flexible element 50d provides lateral decoupling as before-mentioned.

Figure 8:
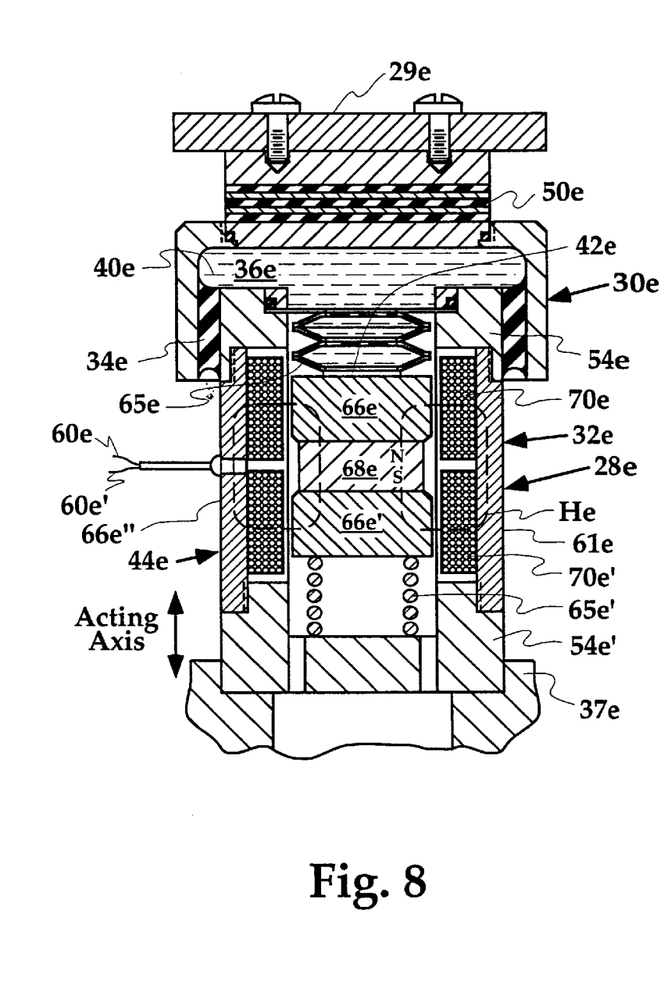
FIG. 8 is an enlarged cross-sectioned side view of another embodiment of active fluid element including a single fluid chamber.

FIG. 8 illustrates another active fluid element 28e which comprises first and second housing members 30e, 32e, second flexible element 34e, a "single" fluid chamber, 36e and a piston 42e interacting with fluid 40e contained therein, and including electromagnet means for driving the piston 42e. In this embodiment, the piston 42e is comprised of a portion of magnet-and-pole assembly 44e which comprises pole pieces 66e, 66e', 66e" and disc-shaped permanent magnet 68e. The magnet 68e and poles 66e, 66e' secured on opposite sides thereof comprise the piston 42e. The piston 42e is driven by a dynamic magnetic field produced by a plurality of wound coils 70e, 70e' surrounding the poles 66e, 66e' and magnet 68e. Wound coils 70e, 70e' are wound in electrical series and in opposite directions (CW and CCW, respectively) such that alternating current applied to leads 60e, 60e' produces dynamic magnetic fields about coils 70e, 70e' which are preferably in opposition to one another. Piston 42e is preferably centered and supported by centering springs 65e, 65e'. Preferably spring 65e is a welded steel bellows spring which exhibits very high volume stiffness Kv, yet a low stiffness along its acting axis. Therefore, as installed, the spring 65e does not contribute to the volume stiffness Kv1 appreciably, as the volume stiffness of flexible element 34e is much softer. Preferably, centering spring 65e would preferably be nonmagnetic and glued to pole piece 66e or precompressed thereagainst.

Second housing member 32e is preferably comprised of soft-magnetic body 61e and nonmagnetic threaded caps 54e, 54e'. Body 61e comprises pole piece 66e". Caps 54e, 54e' thread onto body 61e and precompress centering springs 65e, 65e' which properly centers and positions piston 42e relative to coils 70e, 70e'. The active fluid element 28e is tuned by adjusting the mass of the piston 42e, stiffness of centering springs 65e, 65e', and volume stiffness Kv1 of the first flexible member 34e.

Energizing leads 60e, 60e' with electrical current supplies electrical current to wound coils 70e, 70e' and causes piston 42e to dynamically oscillate, as commanded, and compress fluid 40e in fluid chamber 36e. This causes fluid pressures to act inside the active fluid element 28e and produce active forces between bracket 29e and insert 37e along the acting axis. Third flexible element 50e provides lateral decoupling.

Figures 9A, 9B, 9C, 9D:
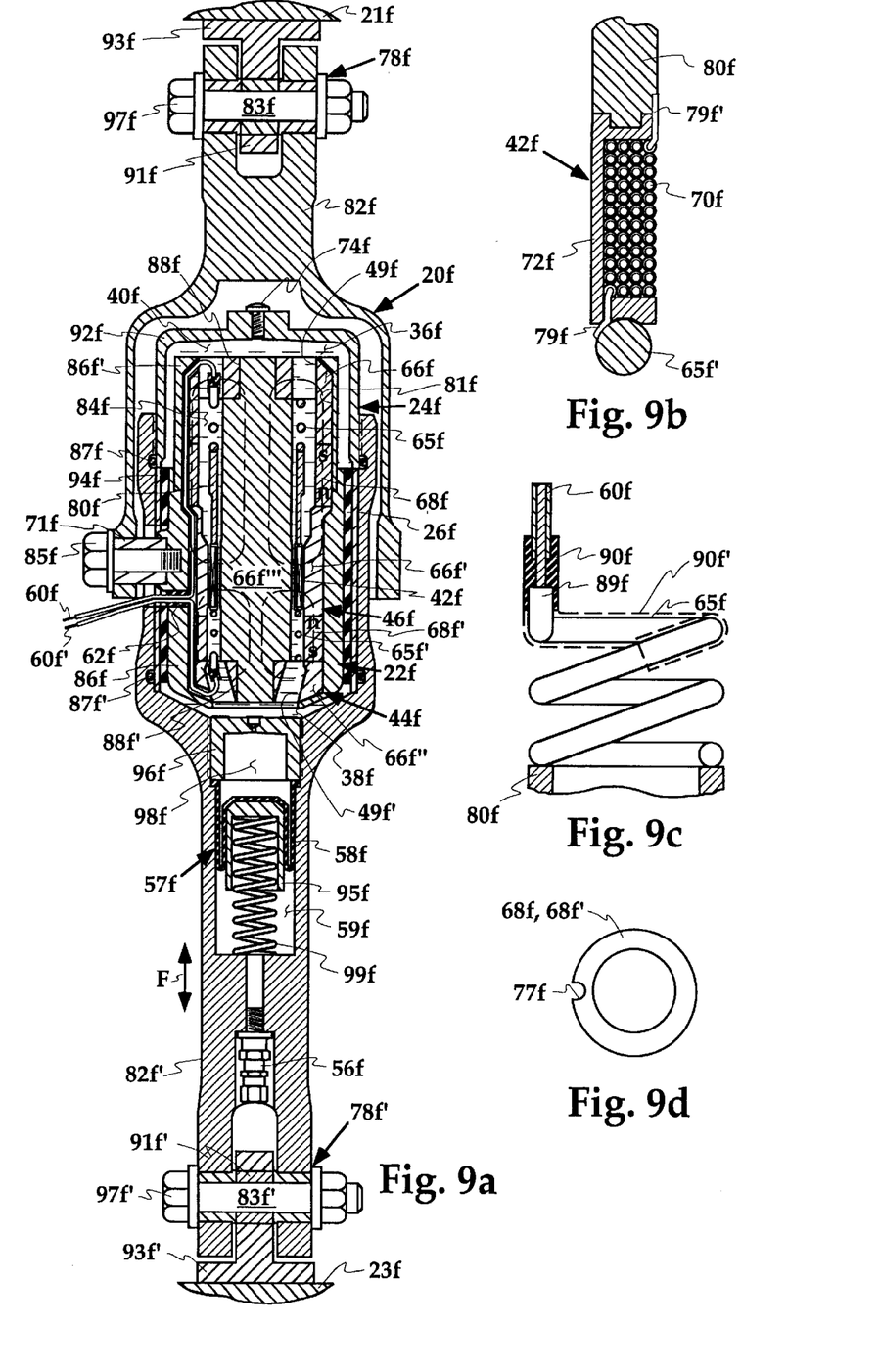

FIG. 9a illustrates another embodiment of active fluid mounting, and in particular, an active pylon isolator 20f, several of which interconnect in parallel relationship in a linkage-like fashion between a vibrating helicopter transmission 21f and a helicopter fuselage, or other helicopter structure 23f. The active pylon isolator 20f produces active (positive and/or dissipative) forces to isolate vibrations between the transmission 21f and structure 23f. However, it should be understood that this isolator 20f has potentially broad applicability, and may be interconnected, and isolate vibrations, between any two relatively vibrating members. This active pylon isolator 20f functions as a linkage-like member, in that the device preferably attaches to the various structures/vibrating members at its ends by pin connections 78f, 78f'. The pin connections 78f, 78f' each preferably comprise a bolt 97f, 97f', or the like, having a pilot portion 83f, 83f' which is rotatable within a bushing 91f, 91f' pressed into bracket 93f, 93f'. Bracket 93f, 93f' attaches to structure 23f and vibrating member 21f by bolts (not shown), or the like. This allows pivoting about the shaft of pilot portion 83f, 83f' of bolts 97f, 97f'. The fluid 40f, which is preferably silicone, is pumped by a cartridge-like motor unit 46f received inside a pocket 81f formed in the high strength, preferably nonmagnetic (ex. aluminum or 300 series stainless steel) inner member 22f.

The motor unit 46f is preferably comprised of a magnet-and-pole assembly 44f, an annular-shaped preferably nonmagnetic piston 42f, and centering springs 65f, 65f'. The motor unit 46f functions to actively pump the fluid 40f. Notably, the motor unit 46f is self-contained and, thus, easily changed out. The magnet-and-pole assembly 44f comprises pole pieces, 66f, 66f', 66f", 66f''', permanent magnets 68f, 68f', springs 65f, 65f', and piston 42f. The pilots 88f, 88f' formed on rod-like center pole piece 66f''' are preferably press fit over slightly smaller receiving bores formed in end cap pole pieces 66f, 66f". Assembly appropriately precompresses coil springs 65f, 65f'. Magnet-and-pole assembly 44f carries the static magnetic field produced by the generally opposed permanent magnets 68f, 68f'. Estimates of the lines of flux are indicated as dotted lines.

The moveable piston 42f as shown in FIG. 9b includes a coil 70f comprising a plurality of circumferentially wound coated copper magnet wires wound about a nonmagnetic, yet electrically conductive bobbin 72f, and may include additional nonmagnetic yet dense (ex. tungsten) annular tuning mass 80f attached thereto. The additional nonmagnetic mass 80f may be used for tuning the dynamic properties of the mounting 20f. The piston 42f is preferably annular-shaped and encircles inner pole piece 66f'''. Likewise, piston 42f is surrounded by intermediate pole piece 66f' and is flexibly suspended by at least one, and preferably two, nonmagnetic yet conductive (ex. beryllium copper) centering springs 65f, 65f' which act to center the piston 42f relative to the afore-mentioned pole pieces 66f', 66f''', as well as provide appropriate spring rate for dynamics. The pumping area Ar of piston 42f is a factor of magnitude or more smaller than the pumping area Ap of the fluid chambers 36f, 38f, thereby providing a hydraulic lever. The oscillating electrical current to the coil 70f is provided through the springs 65f, 65f' via leads 60f, 60f'.

As shown in FIG. 9b, a first end 79f of coated coil 70f is attached to lower spring 65f' by soldering, or the like. A second end 79f' of coil 70f is secured to conducting, yet nonmagnetic (preferably tungsten or copper), tuning mass 80f by soldering, or the like. Although, bobbin 72f and tuning mass 80f are shown as two pieces, preferably, they would be manufactured from one piece construction. As shown in FIG. 9c, the electrical current from lead 60f flows into, and out of, turned out portions 89f of springs 65f. The electrical connection is made by soldering, or the like. Shrink wrap 90f, or the like (shown as sectioned for clarity), will then be heated to shrink over the lead 60f and turn out 89f to further strengthen the electrical connection. The connection between lead 60f' and spring 65f' is substantially similar. Alternatively, the shrink wrap 90f may extend further onto the active portions of the coils as illustrated by dotted lines 90f'. Therefore, the complete electrical circuit connecting leads 60f, 60f' is comprised of springs 65f, 65f', coil 70f, and additional mass 80f. The leads 60f, 60f' rest in localized slots 77f formed in pole pieces 66f, 66f', 66f" and magnets 68f, 68f' (FIG. 9d) and exit the pocket 81f formed in inner member 22f through the lead seal 62f which prevents fluid leakage.

The coil 70f, upon being electrically energized with an oscillating electrical current produces a dynamic magnetic field which interacts with the static field produced by permanent magnets 68f, 68f' thereby causing the piston 42f to oscillate axially. Notably, the piston 42f is preferably contained within a third fluid chamber 84f formed within the motor unit 46f. This third fluid chamber 84f is preferably fluidically interconnected to the first and second fluid chambers 36f, 38f by way of preferably circular ports 49f, 49f' (preferably six per end). Alternatively, the ports 49f, 49f' may be slot segments and may include fluid inertia If.

The motor unit 46f is secured in place within inner member 22f by inserting the components into first inner member half 86f and then threading second inner member half 86f' thereon. Seals 87f, 87f' prevent fluid escape. The motor unit 46f is preferably tuned by adjusting the mass of the piston 42f via adjusting the mass of additional tuning mass 80f, the axial stiffnesses of centering springs 65f, 65f' and the dynamic volume stiffnesses Kv'1, Kv'2 of the first flexible member 26f (via bonding in a different stiffness elastomer or changing the thickness or length of the annular elastomer section). Notably, in this embodiment, the volume stiffness of the mounting 20f is derived from the first elastomer section 26f.

When the piston 42f dynamically oscillates, as electrically commanded, it alternately compresses fluid 40f in first and second fluid chambers 36f, 38f. This causes dynamic fluid pressure to act inside the first fluid chamber 36f between the inner member 22f and the outer member 24f and in the second fluid chamber 38f between inner member 22f and an inner portion of outer member linkage 82f' (which is interconnected to outer member 24f), thereby producing active dynamic forces between inner member linkage 82f and outer member linkage 82f' along the acting axis (designated by arrow F). The outer member 24f is preferably comprised of a cap 92f and a annular sleeve 94f. The cap 92f threads into outer member linkage 82f'. Fill plug 74f provides the means for filling the mounting 20f with fluid 40f. The inner member 22f preferably attaches to inner member linkage 82f via three equally-radially-spaced bolts 85f (only one is shown) which are inserted through bushings 71f. Likewise, outer member 24f preferably attaches to outer member linkage 82f' by threading. Because linkages 82f, 82f' are preferably pin loaded, a third flexible element is not needed to provide lateral load decoupling. Notably, pin joints 78f, 78f' are shown as being aligned. Likewise, they may be rotated 90 degrees from each other providing pivoting in multiple directions.

Within the linkage 82f' of mounting 20f is located the volume compensator 57f. The compensator 57f is comprised of a divider 96f which divides the second fluid chamber 38f from the compensator chamber 98f, a flexible partition 58f (preferably a fabric-reinforced rolling diaphragm) which divides the air chamber 59f and the compensator chamber 98f, and a compensator coil spring 99f causing an axial deflection of support cup 95f. This spring-loaded cup 95f provides static pressurization to the fluid 40f in the mounting 20f. This pressure, which is thought to prevent cavitation under certain conditions, may be augmented by pressurizing gas chamber 59f with a pressurizing valve 56f. It should be recognized that the motor unit 46f may be easily removed/replaced during refurbishment or tuning. Further, it should be recognized that the other motor units (ex. 46a) described herein could easily be incorporated into the fluid mounting 20f.

FLUID PYLON ISOLATOR EXAMPLE

The following are to be considered exemplary of the parameters that would be chosen for a typical fluid pylon isolator 20f for interconnection between a fuselage 23f and a transmission 21f.

fnat is the natural frequency of the piston 42f (75 Hz) (75 1/s), n is the notch ratio (approx. 0.35), f notch is the notch frequency (approx. 26 Hz) (26 1/s), Ws is the total weight of centering springs 65f, 65f' (0.0447 lbf) (0.1988 N), Wr is the weight of piston 42f including the additional mass (0.1117 Lbf) (0.4968 N), Ap is the area of first and second fluid chamber 36f, 38f (7.144 in$^2$) (4,609 mm$^2$), Ar is the pumping area of piston 42f (0.366 in$^2$) (236 mm$^2$), MA is the mechanical advantage (19.5:1), Ka is the axial dynamic stiffness of flexible element 26f (45,000 lbf/in) (7,881 KN/m), Kv'1, Kv'2 is the dynamic volume stiffness of the flexible element 26f (1,615 psi/in$^3$) (696 pascal/mm$^3$), d is the diameter of ports (0.250 in) ((6.35 mm), Nports is the number of ports per end (6), Lport is the length of ports 49f, 49f' (0.18 in) (4.57 mm), Aport is the total area of all ports 49f, 49f' (0.589 in$^2$) (380.0 mm$^2$), ρf is the density of fluid 40f (0.034 lbf/in3) (0.00921 N/cm3), Nturns is the number of turns of wire (47), Nlayer is the number of layers of wire (3), If is the fluid inertia in ports (5.38 E-05 lbf-s$^2$/in$^5$) (2.26 E-06 N-s$^2$/cm$^5$), IDp of inner diameter of wire wrapped on piston (1.34 in) (34.0 mm), Number of magnets 68f, 68f' (2), Br is the remnant field strength (1.14 Tesla), ODm is the magnet outer diameter (2.20 in) (55.88 mm), IDm is the magnet inner diameter (1.60 in) (40.64 mm), lm is the magnet length (0.5 in) (12.7 mm), Bg is the gap field strength (0.6448 Tesla), F is the actuator force 187 lbf (831 N).

Notably, in this system, both Kv'1 and Kv'2 must be considered because they are equivalent in magnitude. The equation for fnat becomes:

$$fnat = \tfrac{1}{2}\pi[Kv'1+Kv'2]/[Ifp+\{Wr+Ws/2)/(Ar^2 g)\}](Hz) \text{ or } (1/s) \qquad \text{Eqn. 15}$$

and $$n^2 = Ka/\{Ka+(Kv'1+Kv'2)Ap^2\}. \qquad \text{Eqn. 16}$$

While various embodiments, including the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. An active fluid mounting, comprising:
   (a) an inner member,
   (b) an outer member,
   (c) a flexible element for flexibly suspending said inner member relative to said outer member, and
   (d) a unitary active fluid element which is readily detachable, capable of providing active forces between said inner member and said outer member, said active fluid element including at least one fluid chamber exhibiting a volume stiffness, wherein said active fluid element further comprises:
      a first housing member for interconnection to one of said inner member and said outer member,
      a second housing member for interconnection to another of said inner member and said outer member,
      a second flexible element for flexibly suspending said first housing member relative to said second housing member and for accommodating motion therebetween,
      a first fluid chamber within said active fluid element having a volume stiffness associated therewith, wherein said first fluid chamber does not derive any of said volume stiffness from said first flexible element,
      a fluid contained within said first fluid chamber;
      a piston within said active fluid element interacting with said first fluid chamber to cause dynamic pressure variations resultantly producing active dynamic forces which act between said inner member and said outer member, and
      means for driving said piston.

2. The active fluid mounting of claim 1 wherein said means for driving said piston is a coil and magnet assembly within said active fluid element further comprising a wound coil and a permanent magnet.

3. The active fluid mounting of claim 2 wherein said coil and magnet assembly, said piston, and pole piece means are included within a motor unit received within said active fluid element.

4. The active fluid mounting of claim 2 wherein a spring flexibly suspends said piston.

5. The active fluid mounting of claim 2 wherein said piston is slidably received in a bore interconnecting with said first fluid chamber and said piston is directly connected to said wound coil and always moves axially therewith.

6. The active fluid mounting of claim 2, wherein said wound coil and said permanent magnet are stationary relative to each other and said piston is inductively-driven due to inductive coupling between said piston and said coil and magnet assembly.

7. The active fluid mounting of claim 1 wherein said piston is an assembly including a nonmagnetic bobbin having a wire circumferentially wound about said bobbin forming a wound coil, and whereby a terminal end portion of said piston dynamically interacts with said fluid in said first fluid chamber upon energizing said wound coil.

8. The active fluid mounting of claim 1 further including a third flexible element which acts to decouple lateral loads acting upon said active fluid element.

9. The active fluid mounting of claim 1 wherein said piston also dynamically interacts with a second fluid chamber within said active fluid element.

10. The active fluid mounting of claim 1 wherein said active fluid element is received within a hollow formed in said inner member and rigidly secured to said inner member and said outer member.

11. The active fluid mounting of claim 1 wherein said piston is contained within an intermediate fluid chamber also containing fluid, said intermediate fluid chamber being interactive with said first and second fluid chambers by ports.

12. The active fluid mounting of claim 1 wherein said inner member, said outer member, and said flexible element for flexibly suspending said inner member relative to said outer member comprise a passive mounting.

13. An active fluid mounting for controlling dynamic vibration between a vibrating member and a structure, comprising:
   (a) a passive mounting having and inner member for attachment to one of said vibrating member and said structure, said inner member including a hollow therein, an outer member for attachment to another of said vibrating member and said structure, and a first flexible element for interconnecting said inner and outer members,
   (b) an active fluid element which is detachable from said passive mounting and received within said hollow, and which does not derive any volume stiffness from said first flexible element, said cartridge-like active fluid element interconnected between said inner member and said outer member of said passive mounting, said active fluid element further comprising;
      (i) a first housing for interconnection to said inner member,
      (ii) a second housing for interconnection to said outer member,
      (iii) a second flexible element for flexibly suspending said first housing relative to said second housing,
      (iv) first and second fluid chambers within said active fluid element each having a volume stiffness,
      (v) a fluid contained in said first and second fluid chambers;
      (vi) a piston interacting with said first and second fluid chambers to cause pressure variations producing active dynamic forces which act between said inner and outer members of said passive mounting, and
      (vii) means for driving said piston which include a coil and magnet assembly having a wound coil and a permanent magnet, which is capable of actively driving said piston upon applying oscillating electrical current to said wound coil.

14. An active fluid mounting having an inner member, an outer member, a first flexible element for interconnecting said inner and outer members, at least one fluid chamber associated with said active fluid mounting having a volume stiffness, a fluid contained within said at least one fluid chamber, the improvement comprising:
   (a) a nonmagnetic piston interacting with said fluid capable of being inductively driven to produce a dynamic pressure variation in said at least one fluid chamber causing dynamic forces between said inner and outer members,
   (b) a permanent magnet for generating a static magnetic field, and
   (c) a coil for inducing a oscillating electrical current within said nonmagnetic piston which generates a dynamic magnetic field which interacts with said static magnetic field to inductively drive said nonmagnetic piston.

15. An active fluid mounting, comprising:
   an inner member,
   an outer member, a flexible element flexibly intervened between said inner and outer members, an active fluid element directly connected between said inner and said outer members, said active fluid element further comprising:
   a first element mounted to said inner member,
   a second element mounted to said outer member,
   a first fluid chamber including a first volume stiffness,
   a second fluid chamber including a second volume stiffness,
   an intermediate fluid chamber communicating with said first and second fluid chambers by ports,
   a fluid contained in said fluid chambers,
   a moveable piston within said intermediate chamber,
   a spring flexibly suspending said moveable piston,
   a permanent magnet generating a static magnetic field,
   pole piece means directing said static magnetic field towards said movable piston, and
   a coil which when electrically energized with oscillating electrical current creates a dynamically-varying magnetic field which interacts with said static magnetic field to oscillate said moveable piston resultantly pumping said fluid through said ports and into and out of said first and second fluid chambers.

16. An active fluid mounting, comprising:

an inner member including a first linkage depending therefrom in a first direction, an outer member including a second linkage depending therefrom in a second direction opposed to said first direction, a flexible element intervening between said inner and outer members, first and second fluid chambers associated with said active fluid mounting, a fluid contained within said fluid chambers, a motor unit received within a pocket formed in said inner member, said motor unit including;
   a moveable piston which is adapted to pump said fluid to and from said first and second fluid chambers,
   a spring flexibly suspending said moveable piston,
   a permanent magnet generating a static magnetic field,
   pole piece means for directing said static magnetic field towards said piston, and
   a coil, which when energized, causes said moveable piston to oscillate.

17. The active fluid mounting of claim 16 wherein said active fluid mounting is an active pylon isolator.

18. The active fluid mounting of claim 16 which functions as an active force producing linkage, in that it is adapted for attaching between a vibrating member and a structure by pin joints interconnecting to said inner and outer members.

19. An active fluid mounting, comprising:

an inner member, an outer member, a flexible element flexibly interconnecting said inner and outer members, an active fluid element intervening between said inner and outer members, said active fluid element including;
   a first housing member mounted to said inner member,
   a second housing member mounted to said outer member,
   a first fluid chamber having a first volume stiffness and a first pumping area,
   a second fluid chamber having a second volume stiffness and a second pumping area,
   a fluid passageway interconnecting said first and second fluid chambers,
   a fluid contained in said first and second fluid chambers and said fluid passageway,
   a moveable piston having a third pumping area moveable within said fluid passageway to pump said fluid, said third pumping area being one tenth the size of said first pumping area and said second pumping area or smaller, spring means attached to and flexibly suspending said moveable piston relative to said inner member, a permanent magnet generating a static magnetic field, pole piece means directing said static magnetic field towards said movable piston, and a coil which when electrically energized with oscillating electrical current creates a dynamically-varying magnetic field which interacts with said static magnetic field to oscillate said moveable piston resultantly pumping said fluid into and out of said first and second fluid chambers.

\* \* \* \* \*